United States Patent
Sedlak et al.

(10) Patent No.: US 10,256,686 B2
(45) Date of Patent: Apr. 9, 2019

(54) ROTOR AND METHOD FOR PRODUCING A ROTOR

(71) Applicant: Efficient Energy GmbH, Feldkirchen (DE)

(72) Inventors: Holger Sedlak, Lochhofen/Sauerlach (DE); Oliver Kniffler, Sauerlach (DE)

(73) Assignee: Efficient Energy GmbH, Feldkirchen (DE)

( * ) Notice: Subject to any disclaimer, the term of this patent is extended or adjusted under 35 U.S.C. 154(b) by 484 days.

(21) Appl. No.: 14/885,899

(22) Filed: Oct. 16, 2015

(65) Prior Publication Data

US 2016/0036275 A1    Feb. 4, 2016

Related U.S. Application Data

(63) Continuation of application No. PCT/EP2014/057280, filed on Apr. 10, 2014.

(30) Foreign Application Priority Data

Apr. 16, 2013    (DE) .................. 10 2013 206 787

(51) Int. Cl.
| | |
|---|---|
| H02K 21/12 | (2006.01) |
| H02K 1/27 | (2006.01) |
| H02K 1/30 | (2006.01) |
| H02K 3/28 | (2006.01) |
| H02K 11/00 | (2016.01) |
| H02K 15/03 | (2006.01) |

(52) U.S. Cl.
CPC .............. H02K 1/278 (2013.01); H02K 1/30 (2013.01); H02K 3/28 (2013.01); H02K 11/0068 (2013.01); H02K 15/03 (2013.01)

(58) Field of Classification Search
CPC ............ H02K 1/278; H02K 1/30; H02K 3/28; H02K 11/0068
USPC .......................... 310/156.06, 156.08, 156.09
See application file for complete search history.

(56) References Cited

U.S. PATENT DOCUMENTS

| | | | |
|---|---|---|---|
| 4,678,954 A | 7/1987 | Takeda et al. | |
| 4,748,359 A | 5/1988 | Yahara et al. | |
| 4,755,699 A * | 7/1988 | Schmider ............... | H02K 29/08 310/156.06 |
| 5,345,669 A | 9/1994 | Zigler et al. | |
| 5,801,470 A | 9/1998 | Soong et al. | |
| 6,204,584 B1 * | 3/2001 | Muszynski .......... | H02K 1/2733 310/156.08 |

(Continued)

FOREIGN PATENT DOCUMENTS

| | | |
|---|---|---|
| DE | 4320894 A1 | 1/1995 |
| DE | 10110660 A1 | 5/2002 |

(Continued)

Primary Examiner — Hanh N Nguyen
(74) Attorney, Agent, or Firm — Michael A. Glenn; Perkins Coie LLP

(57) ABSTRACT

A rotor includes a rotor shaft with a mounting portion along a mounting region of the shaft; and a plurality of permanent magnets mounted in the mounting portion on the rotor shaft, wherein the rotor shaft includes, in the mounting portion, a region with a radius reduced with respect to a circular cross-section, such that a radially measured thickness of a permanent magnet is greater in the region than in an adjacent region with non-reduced radius of the rotor shaft.

9 Claims, 7 Drawing Sheets

(56) References Cited

U.S. PATENT DOCUMENTS 7,202,585 B2 * 4/2007 Ohata .................... H02K 1/278
                                                                                               310/156.43

FOREIGN PATENT DOCUMENTS

| DE | 102004035675 A1 | 3/2006 |
| DE | 102008042696 A1 | 4/2010 |
| EP | 204289 A2 | 12/1986 |
| JP | S61280744 A | 6/1988 |
| JP | S63223466 A | 9/1988 |
| JP | H01160341 A | 6/1989 |
| JP | 10136595 A | 5/1998 |
| JP | 2000209827 A | 7/2000 |
| JP | 2002262533 A | 9/2002 |
| JP | 2005137037 A | 5/2005 |
| JP | 2006050816 A | 2/2006 |
| JP | 2006311777 A | 11/2006 |
| JP | 2007306726 A | 11/2007 |
| JP | 2008092702 A | 4/2008 |
| JP | 2011083064 A | 4/2011 |

* cited by examiner radial impeller of a compressor, for example for a heat pump

ROTOR AND METHOD FOR PRODUCING A ROTOR

CROSS-REFERENCE TO RELATED APPLICATIONS

This application is a continuation of copending International Application No. PCT/EP2014/057280, filed Apr. 10, 2014, which claims priority from German Application No. 10 2013 206 787.9, filed Apr. 16, 2013, which are each incorporated herein in its entirety by this reference thereto.

BACKGROUND OF THE INVENTION

The present invention relates to a rotor and in particular to a rotor with permanent magnets for an electric motor.

Electric motors are used in many applications. Smooth running of the motor is particularly important for applications necessitating high rotational speeds, such as in electric motors for driving a radial compressor. This means that the motor is to run as smoothly as possible, even at high rotational speeds, so that the same does not transmit any vibrations to the overall system in which the motor is incorporated.

Normally, in rotors used for such motors, permanent magnets are mounted on a rotor shaft. Here, for example, a metal rotor shaft is used. Then, two or more permanent magnets are applied to this rotor shaft. These permanent magnets can, for example, be adhered onto the metal rotor shaft, which is produced, for example, of tool steel. Particularly at high rotational speeds, it is important that the permanent magnets are mounted sufficiently tight on the rotor shaft, so that no slip occurs between permanent magnets and rotor shaft and that, on the other hand, the permanent magnets do not become detached from the rotor. Particularly at high rotational speeds, centrifugal forces acting on the permanent magnets are extreme. Shear forces between permanent magnets and rotor shaft are also high, in particular when the motor is under load, i.e. when forces occur that want to "twist" the permanent magnets with respect to the rotor shaft.

Above that, such permanent magnet synchronous motors are driven in that a rotating magnetic field is generated by a stator having at least three stator coils, which drives the rotor with the permanent magnets. This is caused due to the fact that the "instantaneous" magnetic field situation within a stator "runs ahead" of the orientation of the magnetic field fields of the rotor in the rotating direction of the motor, such that the rotor is "pulled behind" by the continuously running ahead magnetic field generated by controlling the stator coils.

Such a permanent magnet synchronous motor can also be operated as electric generator. Here, the rotor is driven by mechanical force, and the movement of the rotor with its permanent magnets effects an induction voltage in the at least three stator coils.

Such an exemplary rotor is shown in FIG. 6. FIG. 6 shows a rotor shaft 100 to which four schematically illustrated permanent magnets 101, 102, 103, 104 are applied. The individual permanent magnets are applied in 90° sectors and magnetized such that alternating magnetic north poles N and magnetic south poles S are arranged outside and inside, as shown schematically in FIG. 6. If a rotor shown in cross-section in FIG. 6 is rotated within a stator comprising at least three coils, an almost sinusoidal electric induction voltage can be sensed at each coil terminal.

The rotor shown in FIG. 6 is not ideal for different reasons.

One reason is the reduced mechanical stability. Due to the shear forces between the surface of the rotor shaft 100 and the adjacent surface of the permanent magnets, a slip can occur between the ring of permanent magnets on the one hand and the rotor shaft on the other hand, or a very high load is applied, for example, to the used adhesive connection. This can have the effect that the permanent magnets become partly or completely detached from the rotor shaft, which can have the effect, in particular at high rotational speeds, that the permanent magnets become partly detached and hit the adjacent stator elements and result in a destruction of the motor.

A further reason is that the induced voltage in the three stator coils is sinusoidal in case of a generator operation, and that also the voltage to be applied to the three stator coils for operating the motor in motor operation will be sinusoidal. Switching a sinusoidal voltage, however, is generally and in particular in a digital environment disadvantageous.

SUMMARY

According to a first embodiment, a rotor may have: a rotor shaft with a mounting portion along a mounting region of the shaft; and a plurality of permanent magnets mounted in the mounting portion on the rotor shaft, wherein the permanent magnets are shaped such that they are connected to the rotor shaft in an interlocking manner in the mounting portion, and wherein the plurality of permanent magnets are magnetized in vertical or horizontal direction when the rotor shaft is oriented such that a symmetry axis of the permanent magnets coincides with a horizontal or vertical reference axis, wherein the rotor shaft includes, in the mounting portion, four flattened regions with a radius reduced with respect to a circular cross-section in non-flattened regions, such that a radially measured thickness of a permanent magnet in a flattened region is greater than in an adjacent non-flattened region with non-reduced radius of the rotor shaft, wherein the four flattened regions are arranged symmetrically along the circumference of the rotor shaft, wherein each flattened region includes an angular sector of at least 35° and at the most 45°, wherein a flattened region is smaller with respect to the angular sector than two adjacent non-flattened regions together, and wherein a permanent magnet in a flattened region and two adjacent non-flattened regions in the mounting portion is connected to the rotor shaft in an interlocking manner.

According to another embodiment, an electric motor or generator may have: an inventive rotor; a stator with at least three coils; and a control device for controlling the three coils such that the stator applies a rotating magnetic field to the rotor, wherein the control device includes switches for switching control signals for the three coils.

According to another embodiment, a method for producing a rotor may have the steps of: mounting a plurality of permanent magnets on a mounting portion of a rotor shaft, wherein the permanent magnets are shaped such that they are connected to the rotor shaft in the mounting portion in an interlocking manner, and wherein the plurality of permanent magnets are magnetized in vertical or horizontal direction, when the rotor shaft is oriented such that a symmetry axis of the permanent magnets coincides with a horizontal or vertical reference axis, wherein the rotor shaft includes, in the mounting portion, four flattened regions with a radius reduced with respect to a circular cross-section in non-flattened regions, such that a radially measured thickness of a permanent magnet in a flattened region is greater than in an adjacent non-flattened region with non-reduced radius of the rotor shaft, wherein the four flattened regions are arranged symmetrically along the circumference of the rotor shaft, wherein each flattened region includes an angular sector of at least 35° and at most 45°, wherein a flattened region is smaller with respect to the angular sector than two adjacent non-flattened regions together, and wherein a permanent magnet in a flattened region and two adjacent non-flattened regions in the mounting portion is connected to the rotor shaft in an interlocking manner.

The present invention is based on a knowledge that no permanent magnets having a ring sector shape in cross section are applied to a shaft with circular cross-section, but that the shaft comprises a region having a radius reduced with respect to a circular cross-section, such that a radially measured thickness of a permanent magnet is greater in that region than in an adjacent region with circular cross-section of the rotor shaft.

This region having a reduced radius of the rotor shaft obtains different advantages. One advantage is that the mechanical connection between permanent magnet and rotor shaft is improved with respect to tangential shear forces, since the material of the rotor shaft "interlocks" with the material of the permanent magnets. Thus, power transmission from the rotor shaft to the permanent magnet or vice versa does not only take place by an adhesive layer or the like, but by the fact that the material of the two components actually "hooks together". A further advantage is that due to the effective thickness of the permanent magnet, now varying along the circumference, a thickness of conceptual elementary magnets varying along the circumference results, which leads to an induced voltage waveform in the stator coils, which is no longer sinusoidal but more square-wave. This allows a significantly less expensive implementation of the electric circuits for processing this voltage in generator operation or for generating these voltages in motor operation.

In one embodiment, the variation of the effective thickness of the permanent magnets is improved further for obtaining an even more square-wave voltage by magnetizing the permanent magnets not radially, but horizontally or tangentially, depending on the position of the magnets. Thereby, an effective magnet thickness exists at each point of the permanent magnet, which is thicker than the radial thickness of the permanent magnet, apart from a small region at the edge of a permanent magnet. Further, due to the region with reduced cross-section "filled" by magnetic material, greater effective magnetic thickness can be obtained, even in the center of a permanent magnet, since the permanent magnets are not magnetized radially, but are magnetized horizontally or tangentially.

The region with reduced radius does not extend across a whole quadrant when using four permanent magnets or does not extend across a significant region of a semicircle when using only two permanent magnets, but merely takes up a specific region, such that apart from the region having a reduced radius also a region having a normal radius with respect to the circular cross-section exists. This region ensures that the rotor shaft is not weakened too much in the mounting region of the shaft where the permanent magnets are mounted. If the permanent magnets were mounted in a mounting region which is merely square, i.e. where the shaft has been reduced from a circular cross section to a square shape, the stability of the rotor shaft would be significantly reduced in this mounting region. In particular at high temperatures and high rotational speeds, this can have the effect that the shaft loses stiffness in these regions and hence, unroundnesses occur which can result in mechanical resonant frequencies which can be below or in the range of the nominal speed of the motor or generator, which is particularly disadvantageous. In embodiments of the present invention, the region having a reduced radius in the mounting region is implemented such that it fills less than two thirds of a circular sector and advantageously even less than half of a circular sector defined by the permanent magnet.

Thus, according to the present invention, a rotor is provided which is, on the one hand, mechanically stable and, on the other hand, electrically effective for allowing easy generation or processing of the stator coil voltages.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
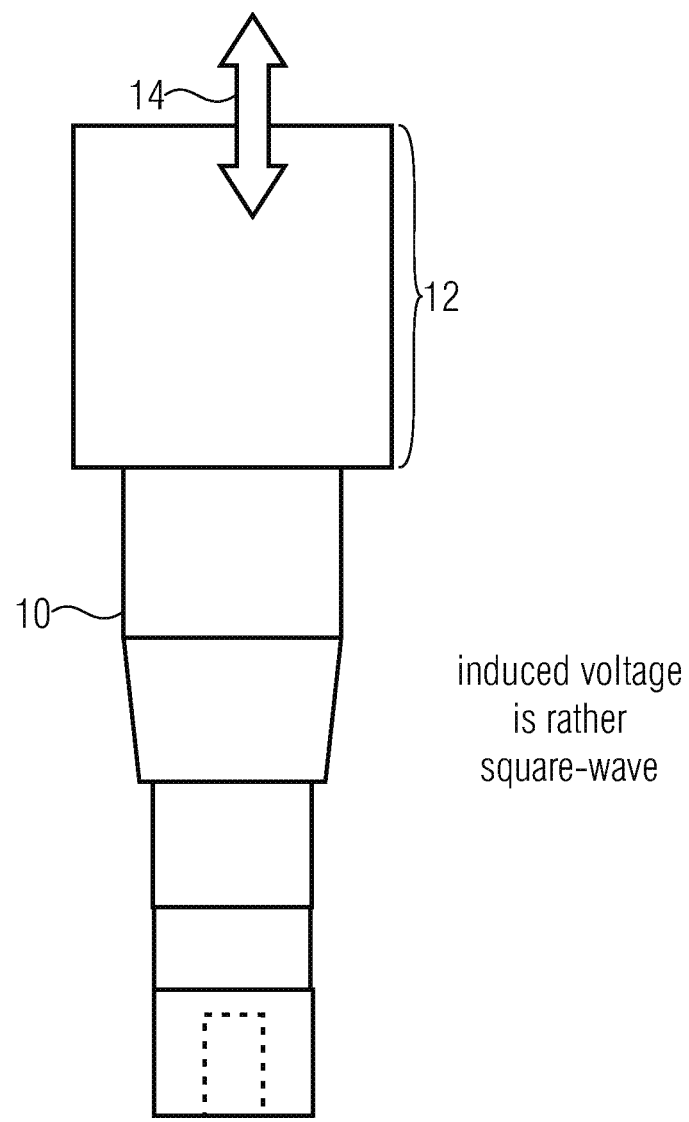
FIG. 1a is a top view of part of the rotor with cross-section indication.
Figure 1B:
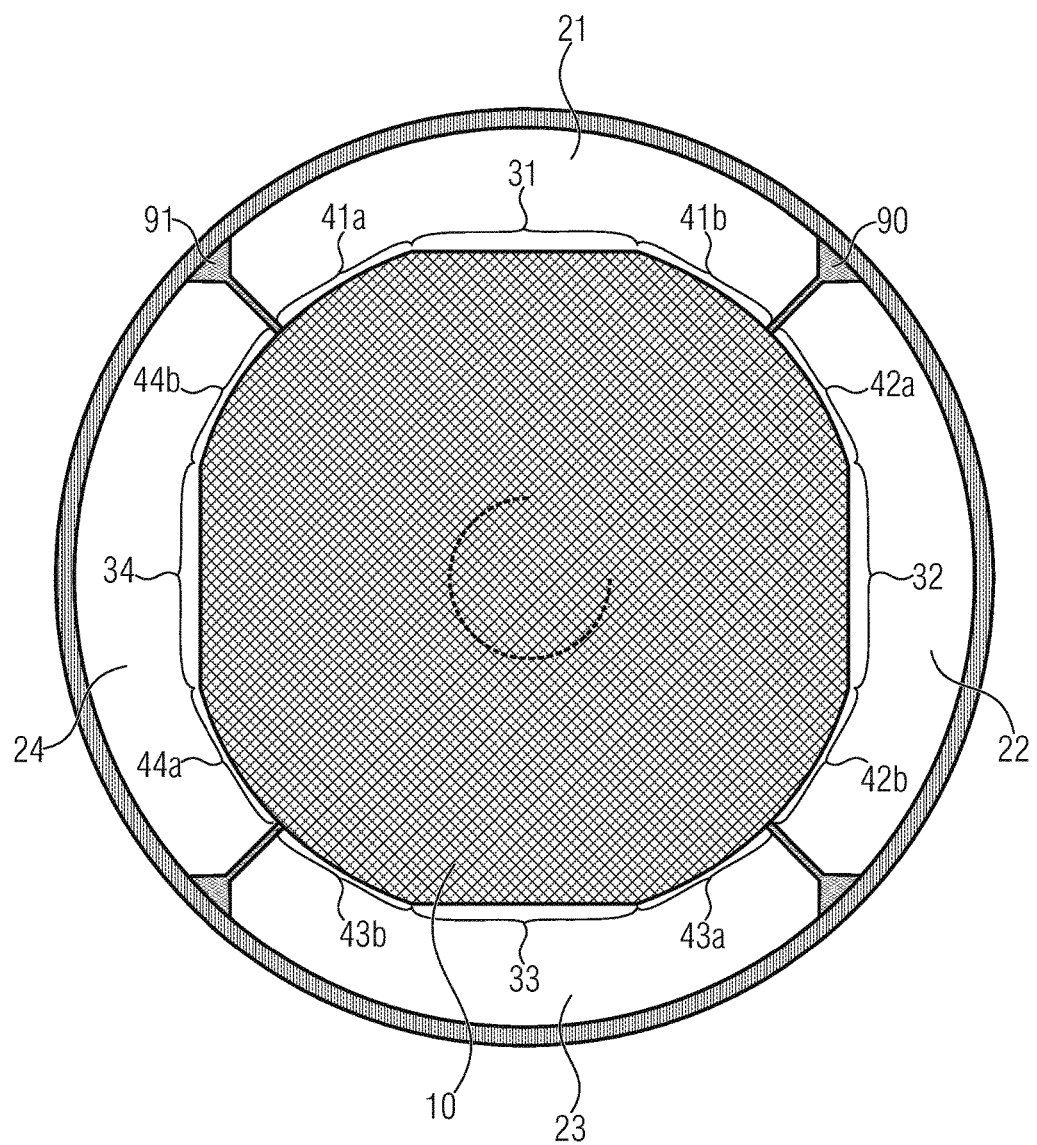
FIG. 1b is a cross-section of the rotor of FIG. 1a at the indicated position.

FIG. 1a shows a top view of part of the rotor with sectional view. The rotor includes a rotor shaft 10 and a mounting portion 12, partly shown in FIG. 1a. FIG. 1b shows a cross-section through the rotor shaft at a position 14 of FIG. 1a. The rotor in FIG. 1b includes the rotor shaft 10 in cross section as well as four permanent magnets 21, 22, 23, 24 which are mounted on the shaft in the mounting portion 12 of the shaft. In the mounting portion 12, the shaft includes a region 31, 32, 33, 34 having a radius reduced with respect to a circular cross-section, such that a radially measured thickness of a permanent magnet in the region 31, 32, 33, 34 is greater than in an adjacent region 41a, 41b, 42a, 42b, 43a, 43b, 44a, 44b having a circular cross-section of the rotor shaft 10. From FIG. 1b, it can be seen that in the region 31 the radial thickness of the permanent magnet is everywhere greater than the radial thickness of the permanent magnet, for example in the region 41a.

Figure 4:
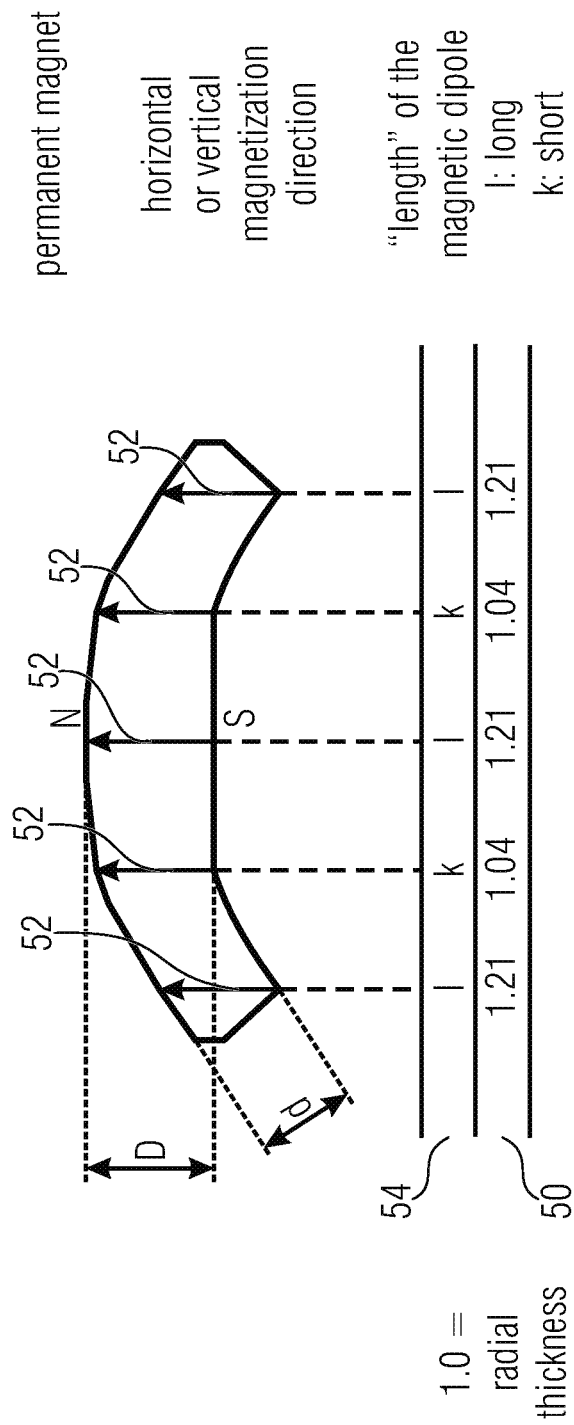
FIG. 4 is a detailed view of a permanent magnet with indication of the magnetization direction.

A permanent magnet is shown in detail in FIG. 4, wherein the radial thickness D is marked in the region 31, and the smaller radial thickness d in the region with circular cross-shape section is also marked. The bottom line 50 in FIG. 4 shows the vertical thickness in relation to the radial thickness d in the circular region. The vertical thickness symbolized by arrows 52 along the permanent magnet has a curve including, from left to right, a long vertical thickness s, a short vertical thickness k, again a long vertical thickness l, again a short vertical thickness k and again a long vertical thickness l, as indicated by letters "l" and "k" in line 54. The ratio of the respective vertical thickness of the permanent magnet to the radial thickness is, where the vertical thickness is long, approximately 1.21, and where the radial thickness is short, approximately 1.04.

In an embodiment of the present invention, the permanent magnet is magnetized such that the direction of the individual "elementary magnets" in the permanent magnet runs exactly along arrows 52. This means that the effective length of an elementary magnet in the permanent magnet varies along the curve of the permanent magnet like the vertical length of the permanent magnet. This variation of the effective length of an elementary permanent magnet has the effect that the induced voltage of a stator coil is no longer sinusoidal, but rather tends towards a square waveform. This is of specific advantage in particular, when the rotor is used in a generator. If the rotor, however, is used in an electric motor, optimum operation is obtained when this rotor, as shown, for example, in FIG. 1b in cross-section, is controlled with a rather square-wave voltage. A rather square-wave voltage can be processed with a significantly less effort, for example by using simple switching transistors, than a rather sinusoidal voltage, in particular in generator or electric motor operation. Thus, the flattened part 31, 32, 33, 34 of the rotor shaft of FIG. 1b provides two advantages. One advantage is the improved mechanical connection between rotor shaft and permanent magnet due to the "interlocking" of the materials of the permanent magnet and the rotor shaft. The second advantage is that a square-wave electric voltage can be used for controlling or is induced, wherein processing rather square-wave voltages with simple switches would be possible with much less effort than when processing sinusoidal voltages.

Figure 2:
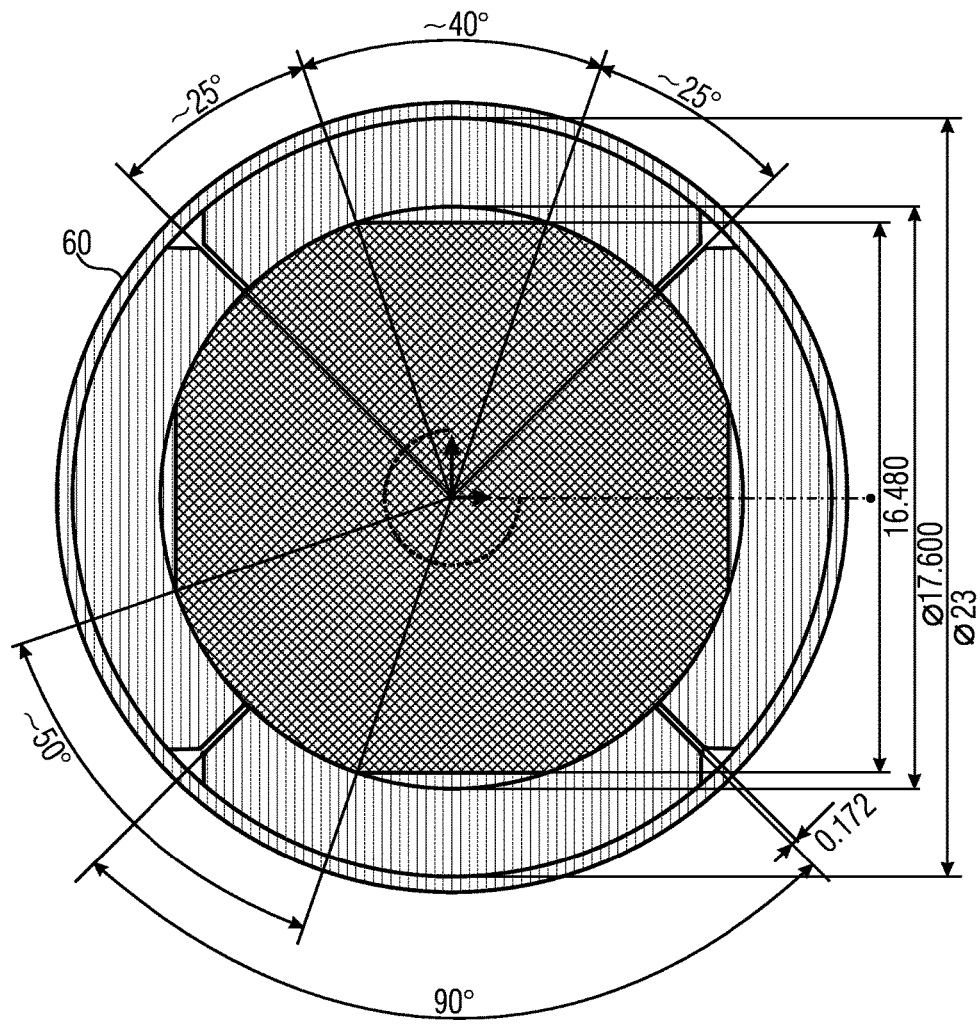
FIG. 2 is a cross-section through the rotor of FIG. 1b, but with specific dimensionings.

FIG. 2 shows a similar cross-section as FIG. 1, but with dimensionings. In the embodiment of a rotor shown in FIG. 2 for a radial impeller of a heat pump as will be illustrated based on FIG. 3, it is advantageous to use a circular cross-section of 17.6 mm. The flattened part or the region with reduced radius is implemented such that the diameter is 16.48 mm. The radial thickness of the permanent magnets is 2.7 mm and the whole rotor is surrounded by a ring-shaped sleeve 60 for improving stability, which is implemented in a relatively thin manner. In one implementation, the ring or the circular sleeve has a thickness of 1.2 mm.

In one embodiment of the present invention, four permanent magnets are symmetrically arranged along the rotor shaft in 90° sectors, such that the region with reduced radius is respectively implemented symmetrically along the center of the permanent magnet. Further, it is advantageous to implement the sector, which is occupied by the region with reduced cross-section, with a size of more than 20° and at the most 80°. In an embodiment, this range is between 35° and 45° and is 40° in the embodiment shown in FIG. 2. The rest of the mounting portion of the shaft, i.e. the region not occupied by the region with reduced cross-section is implemented with circular cross-section. Thus, in the embodiment shown in FIG. 2, a sector with approximately 50° results where the radius or cross-section of the rotor shaft is not reduced between two regions having a reduced radius of the rotor shaft. This results in an improved mechanical stability of the rotor shaft compared to the case where the permanent magnets are applied to a mounting portion of the rotor shaft which is rectangular in cross-section. Thereby, with still very good mechanical stability, high rotational speed can be obtained without the desired rotational speed reaching the range of mechanical resonances.

Figure 3:
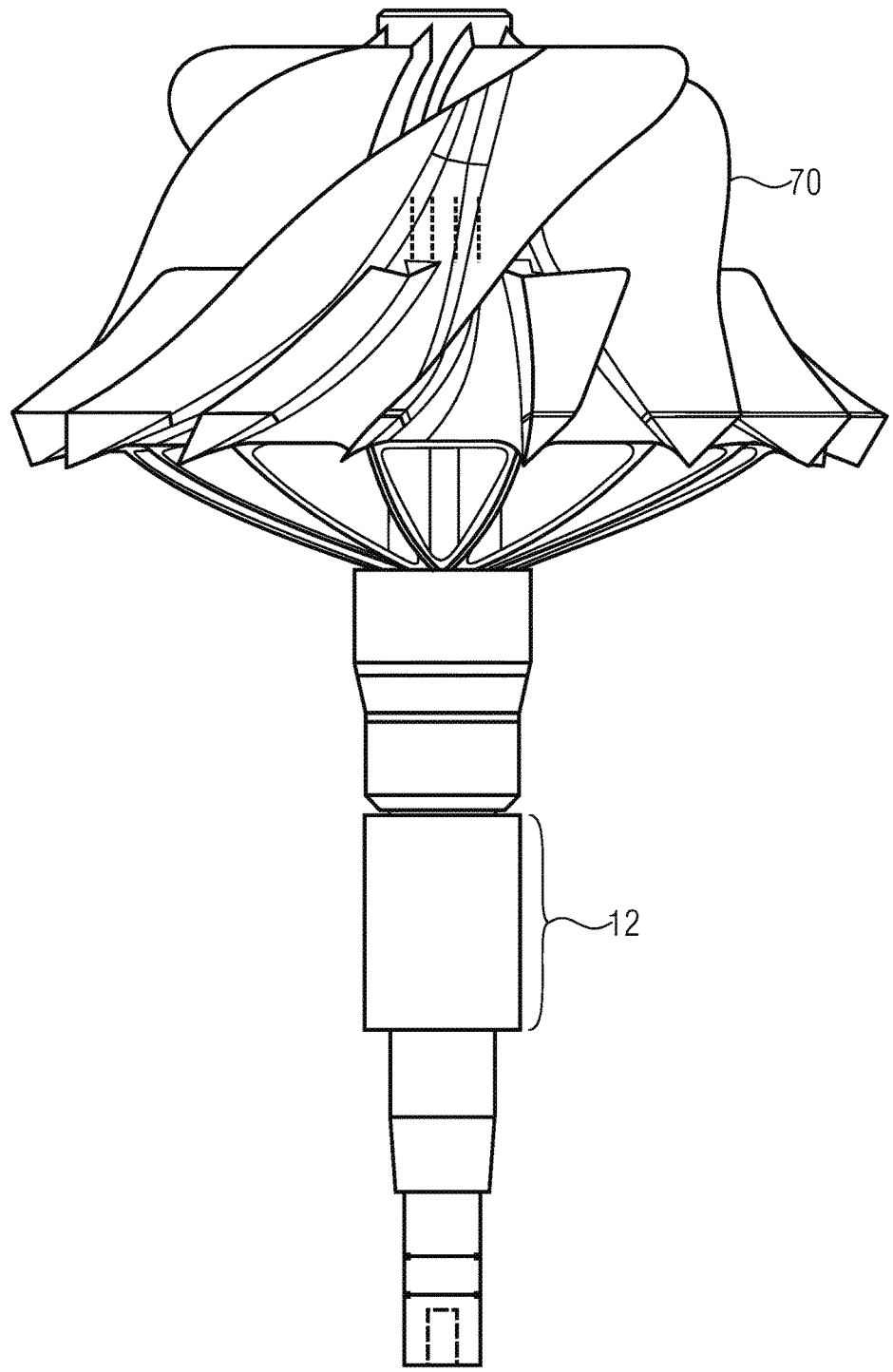
FIG. 3 is a top view of a rotor with a radial wheel of a compressor which can be used, for example, in a heat pump.

In an embodiment of the present invention, as shown in FIG. 3, the rotor is connected to a radial impeller 70, wherein the mounting portion 12 is also shown in FIG. 3. The radial impeller 70 is implemented to compress evaporated working fluid in a compressor of a heat pump. In this heat pump, advantageously, water is used as operating fluid, wherein high rotational speeds are necessitated for compressing water vapor when the dimensions of the heat pumps are to be within suitable dimensions, wherein the rotational speeds can be securely and efficiently obtained by the inventive rotor.

Figure 5:
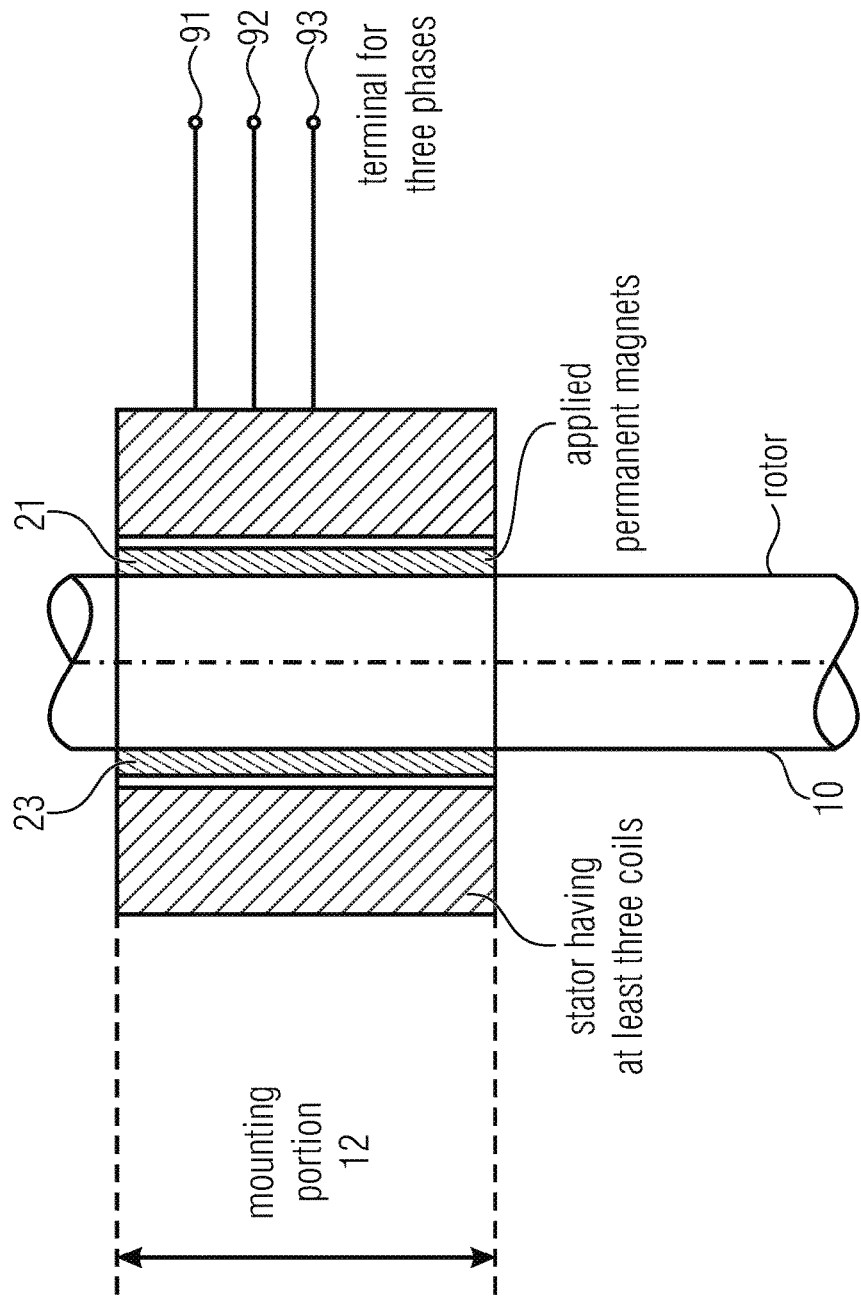
FIG. 5 is a cross-section of a motor or generator with an inventive rotor.

FIG. 5 shows a cross-section through a motor or generator, wherein the motor or generator comprises at least three coils controlled by three phases 91, 92, 93 such that a rotating magnetic field results within the stator, by which the rotor is driven.

Depending on the implementation rotors having two permanent magnets, four permanent magnets, six permanent magnets, or any other even number of permanent magnets can be used, wherein the rotor shaft comprises, for mounting each permanent magnet, a region having a reduced radius, such as a flattened region shown in FIG. 1b. If six permanent magnets are used, there will be six flattened regions or if only two permanent magnets are used, there will be two flattened regions.

While a motor or generator having a stator with three coils is described in FIG. 5, alternatively, a stator having 6, 9, 12, 15, 18 or any respective number of coils divisible by three can be used, wherein then the coils are accordingly arranged along the stator, which are each controlled by one and the same phase of the three phases 91, 92, 93. Thus, a stator typically has a metal sheet stack body with pole shoes, wherein the coils are wound in winding gaps between the pole shows, and wherein the pole shoes are oriented towards the outer limitations of the permanent magnets, i.e. with respect to the stator also radial symmetrically with respect to the axis of the rotor, when the rotor is inserted in the stator.

The permanent magnets can be connected to the rotor shaft in different manners, wherein a connection by adhesive is advantageous. Alternatively, welding, soldering or any other type of connecting can be used.

Figure 6:
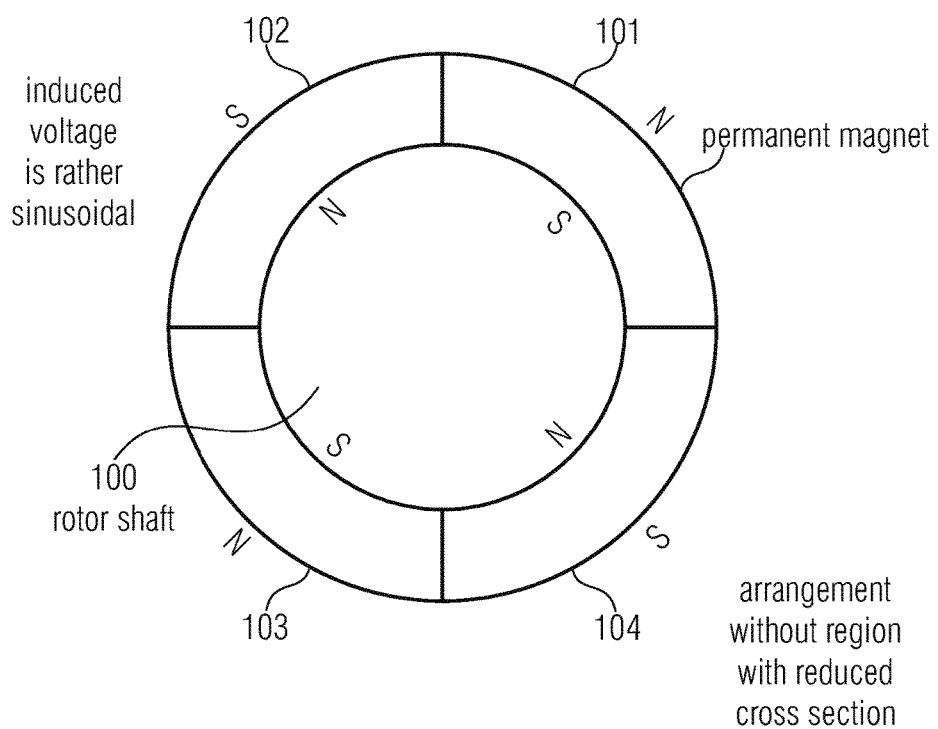
FIG. 6 is a cross-section of a rotor having four permanent magnets for comparison with the present invention.

While above flattened regions have been illustrated as examples for the regions having reduced cross-section, it should be noted that the surface of the flattened regions does not necessarily have to be planar, but can be structured. Above that, the flattened regions can also be implemented in a rippled or any other way, wherein further improvements can be made to obtain a possibly square-wave voltage curve within the coils of the stator by specific shaping of the region having a reduced cross-section. Further, it should be noted that the region having a reduced cross-section along the length of the rotor shaft does not necessarily have to be arranged at the same angular coordinate of the rotor shaft, but can also be arranged helically or spirally, again for obtaining, for example, specific mechanical characteristics or for obtaining specific voltage waveforms which can be processed more efficiently than typical sinusoidal voltage curves as obtained, for example by the comparison example of FIG. 6.

FIG. 1b further shows that the individual permanent magnets are provided with bevels 90. These bevels effect further formation of the reduced magnetic field or the magnetic field to be fed in towards a more square-wave signal waveform. Above that, it can be seen in FIG. 1b that a gap exists between two permanent magnets. The permanent magnets are shaped such that the sector is each slightly smaller than the nominal sector angular number, i.e. when using four permanent magnets, slightly less than 90°. This ensures that the individual permanent magnets rest well on the mounting portion of the rotor shaft, even with respect to unavoidable production tolerances.

Various features of the inventive subject matter have been described as apparatus features in the above figures and description. However, it should be noted that this description can equally also be considered as description of respective method steps. Above that, the above description of a method step analogously applies also as description of a respective apparatus feature.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Rotor, comprising:
a rotor shaft with a mounting portion along a mounting region of the shaft; and
a plurality of permanent magnets mounted in the mounting portion on the rotor shaft, wherein the permanent magnets are shaped such that they are connected to the rotor shaft in an interlocking manner in the mounting portion, and wherein the plurality of permanent magnets are magnetized in vertical or horizontal direction when the rotor shaft is oriented such that a symmetry axis of the permanent magnets coincides with a horizontal or vertical reference axis,
wherein the rotor shaft comprises, in the mounting portion, four flattened regions with a radius reduced with respect to a circular cross-section in non-flattened regions, such that a radially measured thickness of a permanent magnet in a flattened region is greater than in an adjacent non-flattened region with non-reduced radius of the rotor shaft,
wherein the four flattened regions are arranged symmetrically along the circumference of the rotor shaft, wherein each flattened region comprises an angular sector of at least 35° and at the most 45°, wherein a flattened region is smaller with respect to the angular sector than two adjacent non-flattened regions together, and wherein a permanent magnet in a flattened region and two adjacent non-flattened regions in the mounting portion is connected to the rotor shaft in an interlocking manner.

2. Rotor according to claim 1,
wherein the permanent magnets are spaced apart by a gap extending radially with respect to the rotor shaft.

3. Rotor according to claim 1,
wherein the corners of the permanent magnets comprise bevels.

4. Rotor according to claim 1,
wherein a ring-shaped mounting sleeve is arranged around the permanent magnets.

5. Rotor according to claim 1,
wherein the flattened region comprises a planar or non-planar surface.

6. Rotor according to claim 1, wherein the rotor shaft comprises a diameter between 15 mm and 30 mm in a non-flattened region, wherein a diameter in the flattened region is at least 85% and at the most 98% of the diameter in the non-flattened region.

7. Rotor according to claim 1,
wherein the rotor shaft is connected to a radial impeller of a compressor for a heat pump.

8. Electric motor or generator, comprising:
a rotor according to claim 1;
a stator with at least three coils; and
a control device for controlling the three coils such that the stator applies a rotating magnetic field to the rotor, wherein the control device comprises switches for switching control signals for the three coils.

9. Method for producing a rotor, comprising:
mounting a plurality of permanent magnets on a mounting portion of a rotor shaft, wherein the permanent magnets are shaped such that they are connected to the rotor shaft in the mounting portion in an interlocking manner, and wherein the plurality of permanent magnets are magnetized in vertical or horizontal direction, when the rotor shaft is oriented such that a symmetry axis of the permanent magnets coincides with a horizontal or vertical reference axis,
wherein the rotor shaft comprises, in the mounting portion, four flattened regions with a radius reduced with respect to a circular cross-section in non-flattened regions, such that a radially measured thickness of a permanent magnet in a flattened region is greater than in an adjacent non-flattened region with non-reduced radius of the rotor shaft,
wherein the four flattened regions are arranged symmetrically along the circumference of the rotor shaft, wherein each flattened region comprises an angular sector of at least 35° and at most 45°, wherein a flattened region is smaller with respect to the angular sector than two adjacent non-flattened regions together, and wherein a permanent magnet in a flattened region and two adjacent non-flattened regions in the mounting portion is connected to the rotor shaft in an interlocking manner.

* * * * *